(12) United States Patent
Weil et al.

(10) Patent No.: US 7,819,437 B2
(45) Date of Patent: Oct. 26, 2010

(54) FLEXIBLE CAPTIVE FLANGE HOSE CONNECTION AND METHOD

(75) Inventors: Andreas Weil, Mentor, OH (US); Patrick Smith, South Euclid, OH (US); Mathew Johns, Willoughby Hills, OH (US); Peter Rutz, Oerlinghause (DE)

(73) Assignee: Parker-Hannifin Corporation, Cleveland, OH (US)

( * ) Notice: Subject to any disclaimer, the term of this patent is extended or adjusted under 35 U.S.C. 154(b) by 23 days.

(21) Appl. No.: 12/130,033

(22) Filed: May 30, 2008

(65) Prior Publication Data
US 2009/0295154 A1    Dec. 3, 2009

(51) Int. Cl.
*F16L 33/00*    (2006.01)
(52) U.S. Cl. .................. 285/256; 285/142.1; 285/368; 285/414
(58) Field of Classification Search .............. 285/256, 285/136.1, 139.2, 139.3, 142.1, 368, 414
See application file for complete search history.

(56) References Cited

U.S. PATENT DOCUMENTS

| | | | | |
|---|---|---|---|---|
| 1,987,100 | A | * | 1/1935 | Burns ........................ 285/62 |
| 2,310,250 | A | * | 2/1943 | Melsom ................. 285/148.13 |
| 2,525,616 | A | * | 10/1950 | Peeps ....................... 285/247 |
| 2,572,645 | A | * | 10/1951 | Melsom ................... 285/222.4 |
| 2,638,361 | A | * | 5/1953 | Melsom ................... 285/222.1 |
| 2,848,254 | A | * | 8/1958 | Millar ..................... 285/222.5 |
| 3,140,106 | A | * | 7/1964 | Thomas et al. ........... 285/222.4 |
| 3,224,794 | A | * | 12/1965 | Crissy ....................... 285/40 |
| 3,404,903 | A | * | 10/1968 | Frantz ....................... 285/24 |
| 3,545,793 | A | * | 12/1970 | Graffy ..................... 285/142.1 |
| 3,711,131 | A | * | 1/1973 | Evans ....................... 285/256 |
| 3,986,732 | A | * | 10/1976 | Stanley ................... 285/121.3 |
| 3,999,781 | A | * | 12/1976 | Todd ........................ 285/12 |
| 4,023,836 | A | * | 5/1977 | Applehans ................ 285/368 |
| 4,186,946 | A | * | 2/1980 | Snow ....................... 285/94 |
| 4,426,103 | A | * | 1/1984 | Sundholm ................. 285/12 |
| 4,589,688 | A | * | 5/1986 | Johnson .................... 285/12 |
| 4,681,352 | A | | 7/1987 | Sundholm |
| 4,905,492 | A | | 3/1990 | Lobakk |
| 5,120,086 | A | | 6/1992 | Nock |
| 5,413,147 | A | | 5/1995 | Moreiras et al. |
| 5,518,275 | A | | 5/1996 | Mackay |
| 5,931,510 | A | | 8/1999 | Mathew et al. |
| 6,447,017 | B1 | * | 9/2002 | Gilbreath et al. .......... 285/89 |

(Continued)

FOREIGN PATENT DOCUMENTS

DE    2506948    1/1976

(Continued)

*Primary Examiner*—David E Bochna
(74) *Attorney, Agent, or Firm*—Renner, Otto, Boisselle & Sklar, LLP

(57) ABSTRACT

A flange hose fitting assembly and method wherein a captive flange is attached to a flexible hose nipple after the nipple has been crimped to the flexible hose. The flange, which may be selected from different types of flanges, is slipped over the front end of the nipple that is crimped at its back end to the flexible hose, and then locked to the nipple by a suitable retaining device, such as a retaining ring, spring, screw-on or glue-on ring, press-fit ring, piston-ring, shaft seal, U-shaped halves or other split configurations arranged around a locking groove in the nipple, etc.

12 Claims, 3 Drawing Sheets

U.S. PATENT DOCUMENTS

| | | | |
|---|---|---|---|
| 6,485,064 B1 * | 11/2002 | Davidson | 285/353 |
| 6,491,325 B1 * | 12/2002 | Boche | 285/256 |
| 6,554,320 B2 * | 4/2003 | Cresswell | 285/39 |
| 7,014,218 B2 * | 3/2006 | Fisher et al. | 285/256 |

FOREIGN PATENT DOCUMENTS

| | | |
|---|---|---|
| DE | 4414954 | 11/1995 |
| EP | 1631763 | 12/2006 |
| FI | 70080 | 1/1986 |
| GB | 1232938 | 5/1971 |

\* cited by examiner

FLEXIBLE CAPTIVE FLANGE HOSE CONNECTION AND METHOD

FIELD OF THE INVENTION

The present invention relates to flexible hose fittings and methods for making a hose fitting on the end of a flexible hose. More particularly, the invention relates to flange hose fittings and methods of assembly.

BACKGROUND

Threaded port fittings for flexible rubber and plastic hoses are reasonably easy to assemble and provide reasonably high pressure capability for a given size hose. For larger hose sizes, the pressure rating decreases and/or assembly torques increase rapidly. To reduce assembly torques while providing higher pressure ratings for larger size hose fittings, flange connections, typically referred to as 4-bolt flange connections because 4 bolts typically are used, have been developed. Because of the lower assembly torques compared to an equivalent size threaded port, these connections are well-suited for tight quarters where wrench clearances are limited.

Existing hose fittings for flange connections either have two separate flange halves that are connected to the fitting when installed or have a one-piece flange that is assembled to the hose fitting prior to crimping to the hose. In the latter case, larger and more expensive crimpers are needed to provide an opening size sufficient to allow passage of the flange therethrough and sufficient stroke to overcome the difference in diameter to fit the flange through and still crimp the hose fitting to the correct crimp dimension. In addition, separate hose nipples are provided for each type of flange.

SUMMARY OF THE INVENTION

The present invention provides a novel flange hose fitting assembly wherein a captive flange is attached to a flexible hose nipple after the nipple has been secured to the flexible hose. The flange, which may be selected from different types of flanges, is slipped over the front end of the nipple that is secured at its back end to the flexible hose, and then locked to the nipple by a suitable retaining device, such as a retaining ring, spring, screw-on or glue-on ring, press-fit ring, piston-ring, shaft seal, U-shaped halves or other split configurations arranged around a locking groove in the nipple, etc. This novel flange fitting design for flexible hoses enables one or more the following advantages/benefits including:

(a) the user can decide or change a hose assembly connection (flange type) after hose assembly is made, e.g. either use flanges per ISO 6162 part 1 and 2, SAE J518 Code 61/62 or a flange per ISO 6164 and/or other styles of flanges;

(b) crimping the full flange hose assembly does not require a crimper with a big opening to fit the flange thru, which will result in shorter crimper stroke, faster crimp;

(c) only one hose nipple style is needed in inventory vs. multiple hose nipples for conventional systems; and/or (d) avoids scrapping of an entire hose assembly that previously would occur if the wrong flange fitting was inadvertently crimped on the hose.

Accordingly, the invention provides a flange hose fitting assembly for a flexible hose, comprising a nipple having a rear end portion configured for securement to an end of a flexible hose, a flange slipped over the nipple from a front end of the nipple, and a retaining device that retains the flange on the nipple against removal from the front end of the nipple, whereby the flange may be attached to an external component for connecting the flexible hose nipple to the external component.

The flange hose fitting may be further characterized by one or more of the following features:

the flange including at least one bolt hole in addition to a through hole through which the nipple passes.

a front end face of the nipple having an annular groove for receiving an annular resilient seal for sealing to an opposing surface of the external member.

the nipple having a nipple body including an axial through bore and a rearwardly extending insertion portion provided with one or more radially outwardly extending annular protrusions that aid in forming a fluid-tight and secure connection between the hose and nipple when a crimp sleeve is crimped around the hose.

a crimp sleeve or shell assembled to the nipple body and held against axial withdrawal with respect to the nipple body.

the crimp sleeve having on its inner diameter one or more radially inwardly extending protrusions to aid in forming a secure connection between the nipple and the hose.

the retaining device including at least one of a retaining ring, a pressed-on fit, crimped-on fit, or a screwed-on connection.

the retaining ring being a resilient single-piece ring.

the retaining ring being a multi-piece ring.

the flange having a counterbore telescoped over the retaining ring to hold the retaining ring in a retaining groove against radial withdrawal.

According to another aspect of the invention, there is provided in combination, a flexible hose and the flange hose fitting assembly with the nipple secured, as by crimping, to the end of the flexible hose.

According to a further aspect of the invention, there is provided in combination, a nipple having a rear end portion configured for securement to an end of a flexible hose, a plurality of different type flanges each of which slipped over the nipple from a front end of the nipple, and a retaining device for retaining the flange on the nipple against removal from the front end of the nipple, whereby a flange may be selected from the plurality of different flanges and assembled on the nipple from a front end of the nipple after the nipple has been secured relatively permanently, as by crimping or otherwise, to the end of the flexible hose, and then the flange may be attached to an external component for connecting the flexible hose nipple to the external component.

According to yet another aspect of the invention, there is provided a method of assembling a flange hose fitting assembly to an end of a flexible hose, comprising securing a rear end portion of a nipple to the end of the flexible hose, slipping a flange over the nipple from a front end of the nipple after the nipple has been secured to the flexible hose, and using a retaining device to retain the flange on the nipple against removal from the front end of the nipple.

The method of assembling a flange hose fitting assembly to the end of a flexible hose may be further characterized by one or more of the following features:

a crimping operation being performed in a crimper having an opening into which the nipple is inserted to allow for crimping of the nipple to the hose.

the opening in the crimper being large enough to receive the nipple but not large enough to receive the flange if the flange were unitary with the nipple.

the retaining device including one or more of a retaining ring, spring, screw-on or glue-on ring, press-fit ring, piston-ring, shaft seal, U-shaped halves or other split-ring configuration.

the using of the retaining device including assembling a one-piece or multi-piece retaining ring in a retaining groove in the nipple.

after the retaining ring is engaged in the retaining groove, the flange being telescoped over the retaining ring to block radial removal of the ring from the retaining groove.

Further features of the invention will become apparent from the following detailed description when considered in conjunction with the drawings.

DETAILED DESCRIPTION

Figure 1:
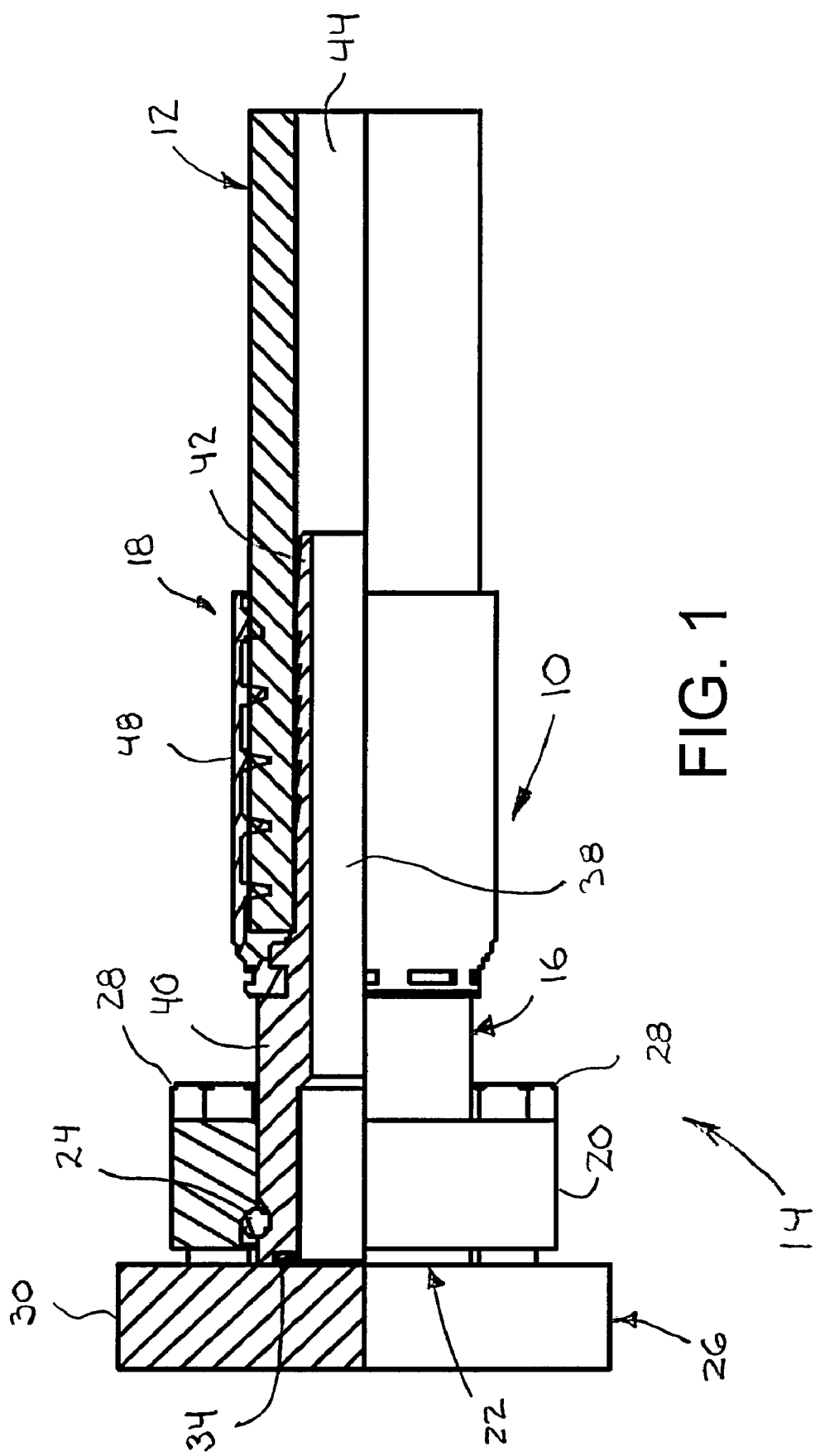
FIG. 1 is a part cross-sectional, part side elevational view of an exemplary flange hose fitting assembly according to the present invention, which assembly comprises a nipple crimped to a flexible hose and a flange retained on the nipple.

Referring now to the drawings in detail and initially to FIG. 1, an exemplary flange hose fitting assembly according to the invention is indicated generally by reference numeral 10. The assembly 10 is shown assembled on the end of a flexible hose 12 to form a flexible hose and fitting assembly 14. The flexible hose 12 may be of any of a variety of types, including for example metallic wire and/or filament yarn reinforced hose constructions containing thermoset rubbers, thermoplastics, thermoplastic elastomers and/or hybrid combinations employing all of these types of materials.

The flange hose fitting assembly 10 generally comprises a nipple 16 having a rear end portion 18 configured for crimping onto an end of the flexible hose 12, a flange 20 slipped over the nipple from a front end 22 of the nipple, and a retaining device 24 for retaining the flange 20 on the nipple against removal from the front end 22 of the nipple, whereby the flange may be attached to an external component 26 for connecting the flexible hose nipple to a fluid passage in the external component 26. The flange may be connected, for example in a conventional manner, by one or more bolts 28, typically four, to a flange or body portion 30 of the external component 26, which may be any component to which a fluid connection is desired between the flexible hose and a fluid flow passage in the external component, or simply to close off the end of the flexible hose. For this purpose, the flange may have one or more bolt holes through which the bolts pass, in addition to nipple opening that typically will be located centrally with respect to the bolt holes. The nipple opening preferably is sized to closely fit over a flange engaging portion of the nipple intermediate its ends.

The front end face of the nipple may have formed therein a groove for retaining an annular seal 34, such as an O-ring, that seals the front 22 end of the nipple to a mating surface of the external component 26 for preventing fluid leakage at the interface between an axial bore 38 in the nipple 16 and the external component. As will be appreciated by those skilled in the art, other sealing configurations may be provided, such as the seal being disposed in the external member rather than in the nipple, and/or radial seals may be used to provide a circumferential seal around the nipple. In addition, seals other than resilient seals may be used, such as metal-to-metal seals.

In the illustrated nipple, the axial bore 38 extends through a body 40 of the nipple 16 from the front to rear ends of the nipple. The body 40 has an insertion portion 42 configured to be inserted into the inner fluid flow channel 44 of the flexible hose 12. As is well known in the art, the outer diameter surface of the insertion portion may be provided with one or more radially outwardly extending annular protrusions 46 (FIG. 2) such as barbs that aid in forming a fluid-tight and secure connection between the hose and nipple when a crimp collar or sleeve 48 is crimped around the hose.

Figure 2:
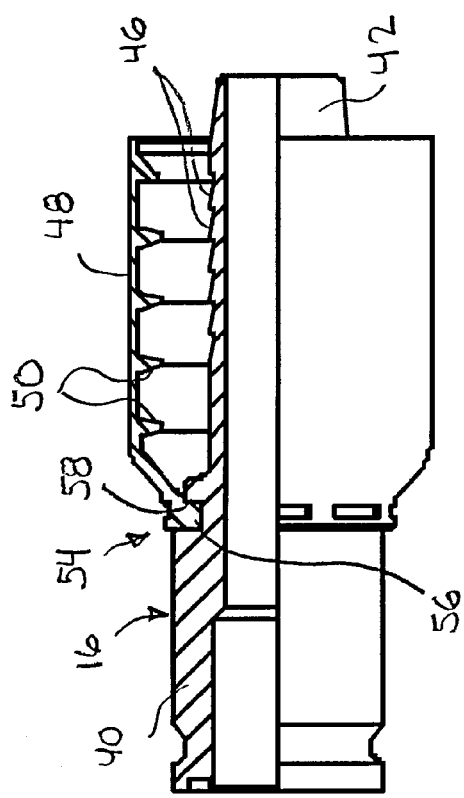
FIG. 2 is a part cross-sectional, part side elevational view showing the nipple prior to be crimped on the flexible hose.
Figure 3:
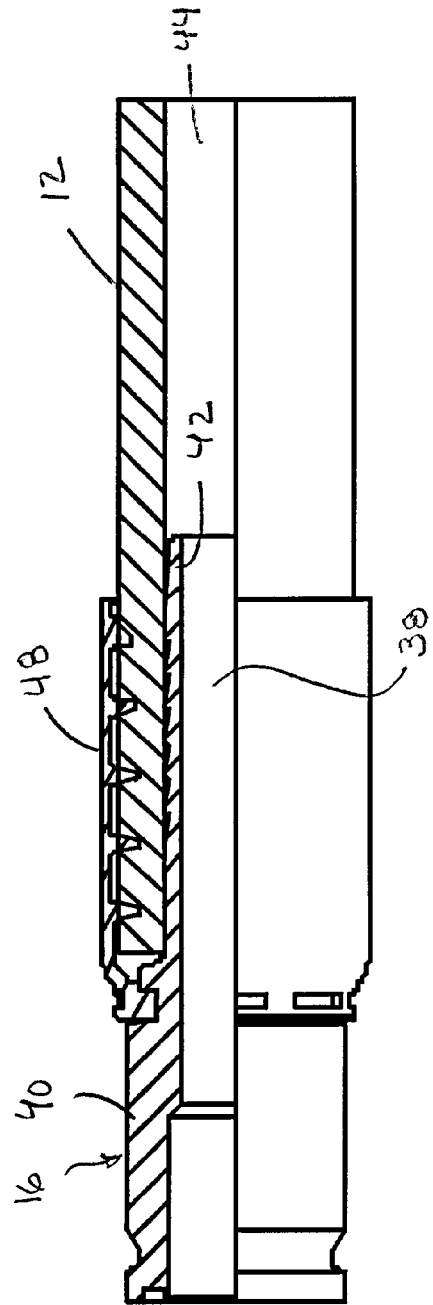
FIG. 3 is a part cross-sectional, part side elevational view showing the nipple crimped on the flexible hose.

As best seen in FIG. 2 where the crimp sleeve 48 is shown prior to crimping, the crimp sleeve, in a well known manner, may have on its inner diameter one or more radially inwardly extending protrusions 50 such as teeth to aid in forming a secure connection between the nipple 16 and the hose 12. When the sleeve is crimped to the hose as seen in FIG. 3, the teeth 50 bite into the outer diameter of the hose to provide an axial interlock against the hose from being pulled out of the crimped sleeve. As seen in FIG. 2, the sleeve 48 may be pre-assembled and retained on the nipple by a retention device 54. As shown, the retention device may be a radially inwardly protruding flange 56 that is axially captured in a radially outwardly opening groove 58 in the nipple body 40. In a well known manner, the crimp sleeve may be slipped over the nipple body and the flange radially inwardly deformed into the groove thereby to engage the flange into the groove to form a secure connection against axial separation of the crimp sleeve and nipple body.

Prior to crimping, the inner ends of the protrusions 50 are suitably spaced from the insertion portion 42 of the nipple 16 to allow axial insertion of the hose 12 into the annular space formed between the sleeve 48 and the insertion portion of the nipple. Once the hose has been so inserted, or the nipple inserted with respect to the hose, the sleeve 48 can be crimped radially inwardly to securely attach the nipple to the hose so as to form the subassembly illustrated in FIG. 3. In addition, a fluid-tight seal will be formed between the nipple and the hose.

The crimping operation may be performed in a conventional crimper and in the same manner as nipples typically are crimped to the ends of flexible hoses. As will be appreciated by those skilled in the art, the crimper need not be provided with a large opening and long stroke previously needed to accommodate the larger diameter flange provided on the prior art flange fittings. According to the prior art, the flange 20 of known flange fittings for flexible hoses was formed integrally with the nipple and thus the crimper had to have an opening considerably larger than that needed to crimp the nipple 16 to the hose sans the flange.

Figure 4:
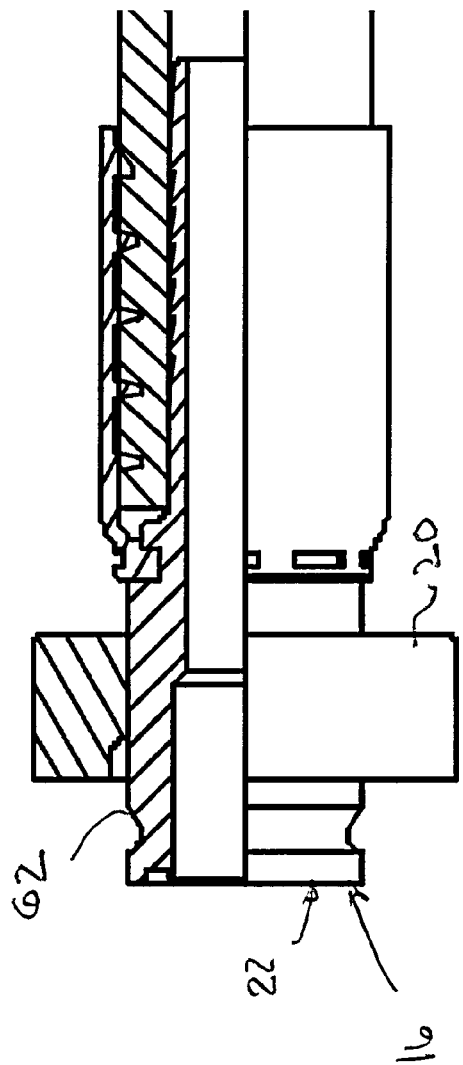
FIG. 4 is a part cross-sectional, part side elevational view showing the flange slipped over the nipple from the front end of the nipple.
Figure 5:
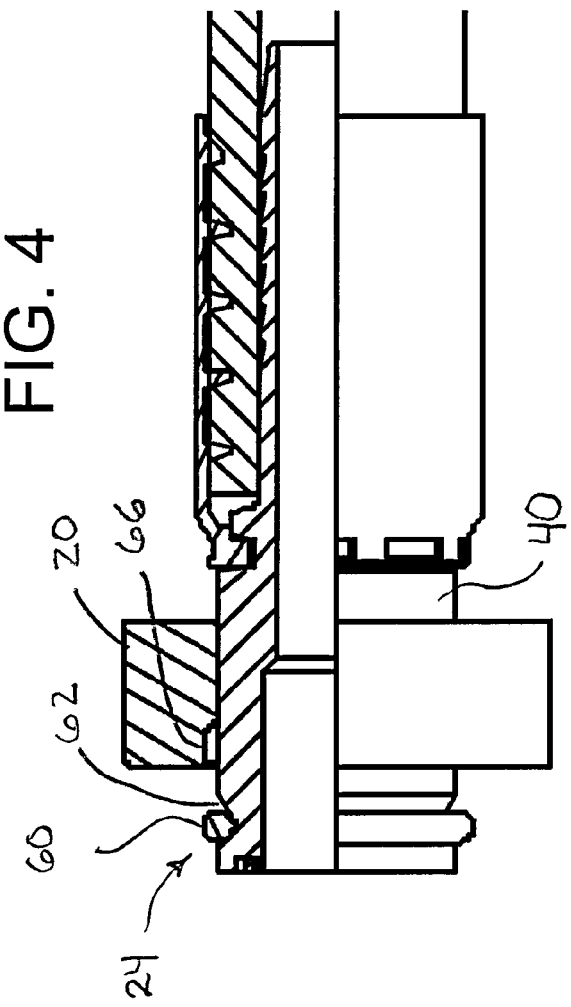
FIG. 5 is a part cross-sectional, part side elevational view showing the flange retained on the nipple by a retaining device.

Once the nipple and hose subassembly shown in FIG. 3 has been formed, the flange 20 can be slipped over the front end 22 of the nipple as seen in FIG. 4 and then retained on the nipple by the retaining device 24 as seen in FIG. 5. As above mentioned, the retaining device may be, for example, a retaining ring, spring, screw-on or glue-on ring, press-fit ring, piston-ring, shaft seal, U-shaped halves or other split configurations arranged around a locking groove in the nipple, etc. In the illustrated embodiment, the retaining device is formed by a retaining ring 60 that locks in a retaining groove 62. In the illustrated embodiment, the groove 62 is a radially outwardly opening circumferential groove formed in the nipple body 40. The retaining ring may be a resiliently expandable ring or composed of two or more segments. Although the retaining groove as shown has a somewhat semicircular shape, the groove could be otherwise shaped and/or alternatively could be formed by a shoulder on the nipple. Moreover, the flange may have a retaining groove in which a retaining ring is carried for passage over the groove or shoulder in the nipple and then radially inward movement so as to be captured in the groove or behind the shoulder.

After the flange 20 has been slipped over the front end of the nipple 16 past the groove 62, the retaining ring 60 (if of a resiliently expandable type) can be resiliently expanded to slip over the front end of the nipple and then radially retract into the groove. The radially outer portion of the ring 60 protrudes radially outwardly from the groove to form a stop that blocks the flange and holds it on the nipple. When the flange is fastened by the bolts 28 (or otherwise) to the external member 26, the flange will be drawn axially against the retaining ring in turn to draw the nipple toward the external member and hold the nipple to the external member.

As is preferred, the flange 20 has an annular recess (e.g. counterbore) 66 concentric with its through bore/passage 68 through which the nipple passes, as best seen in FIG. 5. The counterbore 66 opens to the front end face of the flange for receiving the retaining ring 60. The radially outer dimension of the recess is such that the retaining ring will be precluded from radially expanding out of the retaining groove 62 when the flange is telescoped thereover as seen in FIG. 1. Thus, in place of the a resiliently expandable retaining ring, a split ring can be used, with the segments of the retaining ring being placed in the retaining groove and then the flange telescoped thereover to hold the segments in the retaining groove.

As will be appreciated, the flange may be selected from different types of flanges, such as flanges that differ in one or more respects such as size, bolt hole patterns, configuration, etc. Thus, the user can decide or change a hose assembly connection (flange type) after hose assembly is made, e.g. either use a Code 61 or Code 62 fitting per ISO 6162 or a flange per ISO 6164 and/or other styles of flanges. Also, if the wrong flange is assembled to the nipple, the use of a detachable retention device enables the wrong flange to be removed and the correct one installed, without having to scrap the entire hose and fitting assembly. Moreover, the present invention allows for only one hose nipple style to be stored in inventory vs. multiple hose nipples for conventional systems.

Although the foregoing exemplary embodiment utilized a crimp connection for securing the nipple to the hose, other means may be employed if desired for a particular application. For example, a conventional screw-on connection can be used to secure the nipple to the hose. Such connections typically include an externally threaded insert portion for threading into the interior of the hose and/or an internally threaded shell that is screwed onto the outside of the hose. Another type of connection that may be used is a clamped connection, where in essence a hose clamp of any suitable type would be used in place of the crimp sleeve.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flange hose fitting assembly for a flexible hose, comprising a nipple having a rear end portion configured for securement to an end of a flexible hose, a flange slipped over the nipple from a front end of the nipple, and a retaining device that retains the flange on the nipple against removal from the front end of the nipple, wherein the flange has a through hole and a recess opening radially to the through hole and axially to an end face of the flange, the recess being sized to receive the retaining device when telescoped over the retaining device to hold the retaining device in a retaining groove against withdrawal, whereby the flange may be attached to an external component for connecting the flexible hose nipple to the external component, and wherein the flange includes at least one bolt hole in addition to the through hole through which the nipple passes.

2. The flange hose fitting assembly according to claim 1, wherein the nipple has a nipple body including an axial through bore and a rearwardly extending insertion portion provided with one or more radially outwardly extending annular protrusions that aid in forming a fluid-tight and secure connection between the hose and nipple.

3. The flange hose fitting assembly according to claim 1, further comprising a crimp sleeve assembled to the nipple body.

4. The flange hose fitting assembly according to claim 3, wherein the crimp sleeve has on its inner diameter one or more radially inwardly extending protrusions to aid in forming a secure connection between the nipple and the hose.

5. The flange hose fitting assembly according to claim 1, wherein retaining device includes at least one of a retaining ring, a pressed-on fit, crimped-on fit, or a screwed-on connection.

6. The flange hose fitting assembly according to claim 5, wherein the retaining ring is a resilient single-piece ring.

7. The flange hose fitting assembly according to claim 5, wherein the recess is a counterbore sized to receive the retaining ring when telescoped over the retaining ring.

8. In combination, a flexible hose and the flange hose fitting assembly according to claim 1, wherein the nipple is crimped to the end of the flexible hose.

9. A flange hose fitting assembly for a flexible hose, comprising a nipple having a rear end portion configured for securement to an end of a flexible hose, a flange slipped over the nipple from a front end of the nipple, and a retaining device that retains the flange on the nipple against removal from the front end of the nipple, wherein the flange has a through hole and a recess opening radially to the through hole and axially to an end face of the flange, the recess being sized to receive the retaining device when telescoped over the retaining device to hold the retaining device in a retaining groove against withdrawal, whereby the flange may be attached to an external component for connecting the flexible hose nipple to the external component, wherein a front end face of the nipple has an annular groove for receiving an annular resilient seal for sealing to an opposing surface of the external member.

10. A flange hose fitting assembly for a flexible hose, comprising a nipple having a rear end portion configured for securement to an end of a flexible hose, a flange slipped over the nipple from a front end of the nipple, and a retaining device that retains the flange on the nipple against removal from the front end of the nipple, wherein the flange has a through hole and a recess opening radially to the through hole and axially to an end face of the flange, the recess being sized to receive the retaining device when telescoped over the retaining device to hold the retaining device in a retaining groove against withdrawal, whereby the flange may be attached to an external component for connecting the flexible hose nipple to the external component, wherein retaining device includes at least one of a retaining ring, a pressed-on fit, crimped-on fit, or a screwed-on connection, and wherein the retaining ring is a multi-piece ring.

11. In combination, a flexible hose and the flange hose fitting assembly according to claim 1, further including a plurality of different type flanges each of which slipped over the nipple from a front end of the nipple, whereby a flange may be selected from the plurality of different flanges and assembled on the nipple from a front end of the nipple after the nipple has been secured to the end of the flexible hose.

12. The combination of claim 11, wherein the flanges differ in size.

\* \* \* \* \*